(12) United States Patent
Dharia et al.

(10) Patent No.: US 11,756,283 B2
(45) Date of Patent: Sep. 12, 2023

(54) SMART SENSOR IMPLEMENTATIONS OF REGION OF INTEREST OPERATING MODES

(71) Applicant: Waymo LLC, Mountain View, CA (US)

(72) Inventors: Nirav Dharia, Milpitas, CA (US); Lucian Ion, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 55 days.

(21) Appl. No.: 17/123,440

(22) Filed: Dec. 16, 2020

(65) Prior Publication Data

US 2022/0188560 A1 Jun. 16, 2022

(51) Int. Cl.
*G06V 10/20* (2022.01)
*H04N 5/232* (2006.01)
(Continued)

(52) U.S. Cl.
CPC .......... *G06V 10/255* (2022.01); *G06T 7/246* (2017.01); *G06V 40/162* (2022.01); *H04N 23/70* (2023.01);
(Continued)

(58) Field of Classification Search
CPC .... H04N 5/343; H04N 5/23232; H04N 5/235; H04N 5/23218; H04N 5/23229;
(Continued)

(56) References Cited

U.S. PATENT DOCUMENTS 4,175,860 A 11/1979 Bacus
4,692,806 A 9/1987 Anderson et al.
(Continued)

FOREIGN PATENT DOCUMENTS

CN 106599828 4/2017
GB 2298538 9/1996
(Continued)

OTHER PUBLICATIONS

A Low-Power Multifunctional CMOS Sensor Node for an Electronic Façade—2014 (Year: 2014).*
(Continued)

*Primary Examiner* — Nizar N Sivji
(74) *Attorney, Agent, or Firm* — MCDONNELL BOEHNEN HULBERT & BERGHOFF LLP

(57) ABSTRACT

A system includes an image sensor having a plurality of pixels that form a plurality of regions of interest (ROIs), and configured to operate at a frame rate higher than a threshold rate. The system also includes an image processing resource. The system further includes control circuitry configured to perform operations that include obtaining, from the image sensor, a full-resolution image of an environment. The full-resolution image contains each respective ROI of the plurality of ROIs. The operations also include selecting a particular ROI based on the full-resolution image, and detecting an object of interest in the particular ROI. The operations include determining a mode of operation by which subsequent image data generated by the particular ROI is to be processed. The operations further include processing, based on the mode of operation and the frame rate, the image data comprising a plurality of ROI images of the object of interest.

20 Claims, 7 Drawing Sheets

(51) Int. Cl.
    *G06T 7/246* (2017.01)
    *H04N 5/235* (2006.01)
    *G06V 40/16* (2022.01)
    *H04N 23/70* (2023.01)
    *H04N 23/951* (2023.01)

(52) U.S. Cl.
    CPC . *H04N 23/951* (2023.01); *G06T 2207/20084* (2013.01)

(58) Field of Classification Search
    CPC ....... H04N 5/23245; G06T 7/33; G06T 7/215;
            G06T 7/11; G06T 7/246; G06T
            2207/20084; G06V 40/10; G06V 10/255;
            G06V 40/162; G06V 10/25; G06V 20/56
    See application file for complete search history.

(56) References Cited

U.S. PATENT DOCUMENTS

| | | |
|---|---|---|
| 5,262,871 A | 11/1993 | Wilder et al. |
| 5,988,862 A | 11/1999 | Kacyra et al. |
| 6,320,618 B1 | 11/2001 | Aoyama |
| 6,466,265 B1 | 10/2002 | Lee et al. |
| 6,473,122 B1 | 10/2002 | Kanekal |
| 7,129,978 B1 | 10/2006 | Brehmer et al. |
| 7,227,116 B2 | 6/2007 | Glecker |
| 7,459,663 B2 | 12/2008 | Raynor |
| 7,728,900 B2 | 6/2010 | Fukushima et al. |
| 8,027,029 B2 | 9/2011 | Lu et al. |
| 8,064,643 B2 | 11/2011 | Stein et al. |
| 8,089,522 B2 | 1/2012 | Choi et al. |
| 8,477,190 B2 | 7/2013 | Giuffrida et al. |
| 8,809,759 B2 | 8/2014 | Mo et al. |
| 8,855,849 B1 | 10/2014 | Ferguson et al. |
| 8,866,943 B2 | 10/2014 | Park et al. |
| 9,092,841 B2 | 7/2015 | Silver |
| 9,145,139 B2 | 9/2015 | Ferguson et al. |
| 9,157,988 B2 | 10/2015 | Cho et al. |
| 9,224,053 B1 | 12/2015 | Ferguson et al. |
| 9,237,286 B2 | 1/2016 | Theuwissen |
| 9,285,893 B2 | 3/2016 | Holz |
| 9,288,402 B2 | 3/2016 | Moldovan et al. |
| 9,440,535 B2 | 9/2016 | Schofield |
| 9,467,638 B2 | 10/2016 | Chen et al. |
| 9,508,014 B2 | 11/2016 | Lu et al. |
| 9,537,501 B2 | 1/2017 | Lee et al. |
| 9,578,234 B2 | 2/2017 | Tran |
| 9,584,745 B2 | 2/2017 | Ladd |
| 9,720,412 B1 | 8/2017 | Zhu et al. |
| 9,983,590 B2 | 5/2018 | Templeton et al. |
| 10,018,609 B2 | 7/2018 | Miller et al. |
| 10,104,318 B2 | 10/2018 | Smith et al. |
| 10,181,084 B2 | 1/2019 | Ferguson et al. |
| 10,191,155 B2 | 1/2019 | Curatu |
| 10,248,874 B2 | 4/2019 | Moosaei et al. |
| 10,345,447 B1 | 7/2019 | Hicks |
| 10,440,293 B1 | 10/2019 | Ihns |
| 10,447,966 B2 | 10/2019 | Ritchey et al. |
| 10,466,712 B2 * | 11/2019 | Ferguson .............. G08G 1/167 |
| 11,252,366 B2 | 2/2022 | Dharia et al. |
| 11,284,021 B1 | 3/2022 | Cardei et al. |
| 11,310,451 B1 | 4/2022 | Ion et al. |
| 11,428,550 B2 | 8/2022 | Dharia et al. |
| 2004/0085443 A1 | 5/2004 | Kallioniemi et al. |
| 2004/0190092 A1 | 9/2004 | Silverbrook et al. |
| 2008/0129844 A1 * | 6/2008 | Cusack .............. H04N 5/23229 348/241 |
| 2008/0243439 A1 | 10/2008 | Runkle et al. |
| 2008/0291304 A1 | 11/2008 | Ota et al. |
| 2011/0063446 A1 | 3/2011 | McMordie et al. |
| 2012/0053755 A1 | 3/2012 | Takagi |
| 2012/0268727 A1 | 10/2012 | Schrey et al. |
| 2014/0368702 A1 | 12/2014 | Kuroda |
| 2015/0169964 A1 | 6/2015 | Finn et al. |
| 2016/0021302 A1 | 1/2016 | Cho et al. |
| 2016/0275642 A1 | 9/2016 | Abeykoon et al. |
| 2016/0323524 A1 | 11/2016 | Smith et al. |
| 2016/0337608 A1 | 11/2016 | Numata |
| 2017/0195596 A1 | 7/2017 | Vogelsang et al. |
| 2017/0269198 A1 | 9/2017 | Hall et al. |
| 2018/0005384 A1 * | 1/2018 | Ding ...................... G06T 7/246 |
| 2018/0132726 A1 | 5/2018 | Dickie et al. |
| 2018/0189574 A1 | 7/2018 | Brueckner et al. |
| 2018/0211128 A1 | 7/2018 | Hotson et al. |
| 2018/0225941 A1 * | 8/2018 | Kim ................ G08B 13/19676 |
| 2018/0232947 A1 * | 8/2018 | Nehmadi ................ G01S 7/295 |
| 2018/0299534 A1 | 10/2018 | Lachapelle et al. |
| 2018/0308202 A1 | 10/2018 | Appu et al. |
| 2019/0004534 A1 | 1/2019 | Huang et al. |
| 2019/0035154 A1 | 1/2019 | Liu |
| 2019/0042860 A1 * | 2/2019 | Lee ...................... G06T 3/4053 |
| 2019/0079193 A1 | 3/2019 | Gunnam |
| 2019/0081100 A1 | 3/2019 | Matsumoto et al. |
| 2019/0087198 A1 | 3/2019 | Frascati et al. |
| 2019/0095721 A1 | 3/2019 | Ion et al. |
| 2019/0098233 A1 | 3/2019 | Gassend et al. |
| 2019/0108410 A1 * | 4/2019 | Zhang ................... G06V 10/20 |
| 2019/0135196 A1 | 5/2019 | Vaid et al. |
| 2019/0138835 A1 * | 5/2019 | Xiong ................... G06N 20/00 |
| 2019/0178974 A1 | 6/2019 | Droz |
| 2019/0180133 A1 | 6/2019 | Shannon et al. |
| 2019/0217791 A1 | 7/2019 | Bradley et al. |
| 2019/0220013 A1 | 7/2019 | Bradley et al. |
| 2019/0220014 A1 | 7/2019 | Bradley et al. |
| 2019/0236393 A1 * | 8/2019 | Wang .................. G06V 10/147 |
| 2019/0260385 A1 | 8/2019 | Niwa |
| 2019/0266418 A1 | 8/2019 | Xu et al. |
| 2019/0271767 A1 | 9/2019 | Keilaf et al. |
| 2019/0311546 A1 | 10/2019 | Tay et al. |
| 2019/0317193 A9 | 10/2019 | O'Keefe |
| 2019/0384291 A1 * | 12/2019 | Michalakis .......... G06V 10/764 |
| 2020/0103507 A1 | 4/2020 | Kirillov et al. |
| 2020/0125890 A1 | 4/2020 | Donahue et al. |
| 2020/0174107 A1 | 6/2020 | Briggs et al. |
| 2020/0195875 A1 * | 6/2020 | Berkovich ......... H04N 5/23225 |
| 2020/0320677 A1 | 10/2020 | Ion et al. |
| 2020/0321374 A1 | 10/2020 | Ion et al. |
| 2020/0389591 A1 * | 12/2020 | Liu ...................... G11B 27/005 |
| 2021/0072398 A1 | 3/2021 | Matsunaga |
| 2021/0114616 A1 | 4/2021 | Altman |
| 2021/0152769 A1 | 5/2021 | Dharia et al. |
| 2021/0278257 A1 | 9/2021 | Dharia et al. |
| 2022/0076032 A1 | 3/2022 | Jain et al. |
| 2022/0188560 A1 | 6/2022 | Dharia et al. |

FOREIGN PATENT DOCUMENTS

| | | |
|---|---|---|
| JP | 6852706 | 10/2014 |
| KR | 101899549 | 9/2018 |
| KR | 102043922 | 12/2019 |
| WO | 2015/046735 | 3/2019 |

OTHER PUBLICATIONS

Dinh, Thang Ba, et al., "High Resolution Face Sequences from a PTZ Network Camera," 2011 IEEE International Conference on Automatic Face and Gesture Recognition (FG), May 19, 2011.

International Searching Authority, International Search Report and Written Opinion, dated Mar. 22, 2022 in connection with International Patent Application No. PCT/US2021/072721, filed Dec. 3, 2021, 8 pages.

Horaud et al., "An Overview of Depth Cameras and Range Scanners Based on Time-of-Flight Technologies," Machine Vision and Applications, 2016, pp. 1005-1020, vol. 27, No. 7.

International Searching Authority, International Search Report and Written Opinion dated Mar. 16, 2021, issued in connection with International Patent Application No. PCT/US2020/060960 filed Nov. 18, 2020, 9 pages.

Puletic, Dusan, "Generating and Visualizing Summarizations of Surveillance Videos," Thesis submitted to George Mason University, 2012, 55 pages.

(56) References Cited

OTHER PUBLICATIONS

Quaritsch et al., "Autonomous Multicamera Tracking on Embedded Smart Cameras," EURASIP Journal on Embedded Systems, vol. 2007, Article ID 92827, Published Jan. 2007, 10 pages.

Wang et al., "Cooperative Object Tracking and Composite Event Detection With Wireless Embedded Smart Cameras," IEEE Transactions On Image Processing, vol. 19, No. 10, Published Jun. 14, 2010, 20 pages.

* cited by examiner

SMART SENSOR IMPLEMENTATIONS OF REGION OF INTEREST OPERATING MODES

BACKGROUND

An image sensor includes a plurality of light-sensing pixels that measure an intensity of light incident thereon and thereby collectively capture an image of an environment. A frame rate may be applied to the image sensor to allow the image sensor to generate images of the environment. Image sensors may be used in a plurality of applications such as photography, robotics, and autonomous vehicles.

SUMMARY

An image sensor may contain a plurality of regions of interest (ROIs), each of which may be read out independently of the other ROIs. The image sensor may be used to capture a full-resolution image that includes each of the ROIs. Based on the content of the full-resolution image, an ROI may be selected from which ROI images are to be acquired. These ROI images may be acquired at a higher frame rate than the full-resolution image. The image sensor may be configured to operate at a frame rate higher than a threshold rate, and a corresponding number of frames can be processed during a given duty cycle. Upon detection of objects of interest, frames that comprise ROI images of the objects of interest can be processed during one or more next duty cycles, thereby increasing a processing speed for images.

In a first example embodiment, a system is provided that includes an image sensor having a plurality of pixels that form a plurality of regions of interest (ROIs). The image sensor is configured to operate at a frame rate higher than a threshold rate. The system also includes an image processing resource. The system further includes control circuitry configured to perform operations that include obtaining, from the image sensor, a full-resolution image of an environment. The full-resolution image contains each respective ROI of the plurality of ROIs. The operations also include selecting a particular ROI based on the full-resolution image. The operations further include detecting at least one object of interest in the particular ROI. The operations also include determining a mode of operation by which subsequent image data generated by the particular ROI is to be processed. The operations further include processing, based on the mode of operation and the frame rate, the image data comprising a plurality of ROI images of the at least one object of interest.

In a second example embodiment, a method is provided that includes obtaining, by control circuitry and from an image sensor comprising a plurality of pixels that form a plurality of regions of interest (ROIs), a full-resolution image of an environment. The full-resolution image contains each respective ROI of the plurality of ROIs. The image sensor is configured to operate at a frame rate higher than a threshold rate. The method also includes selecting a particular ROI based on the full-resolution image. The method further includes detecting at least one object of interest in the particular ROI. The method also includes determining a mode of operation by which subsequent image data generated by the particular ROI is to be processed. The method further includes processing, based on the mode of operation and the frame rate, the image data comprising a plurality of ROI images of the at least one object of interest.

In a third example embodiment a non-transitory computer readable storage medium is provided having stored thereon instructions that, when executed by a computing device, cause the computing device to perform operations. The operations include obtaining, from an image sensor comprising a plurality of pixels that form a plurality of ROIs, a full-resolution image of an environment. The full-resolution image contains each respective ROI of the plurality of ROIs. The image sensor is configured to operate at a frame rate higher than a threshold rate. The operations also include selecting a particular ROI based on the full-resolution image. The operations further include detecting at least one object of interest in the particular ROI. The operations also include determining a mode of operation by which subsequent image data generated by the particular ROI is to be processed. The operations further include processing, based on the mode of operation and the frame rate, the image data comprising a plurality of ROI images of the at least one object of interest.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
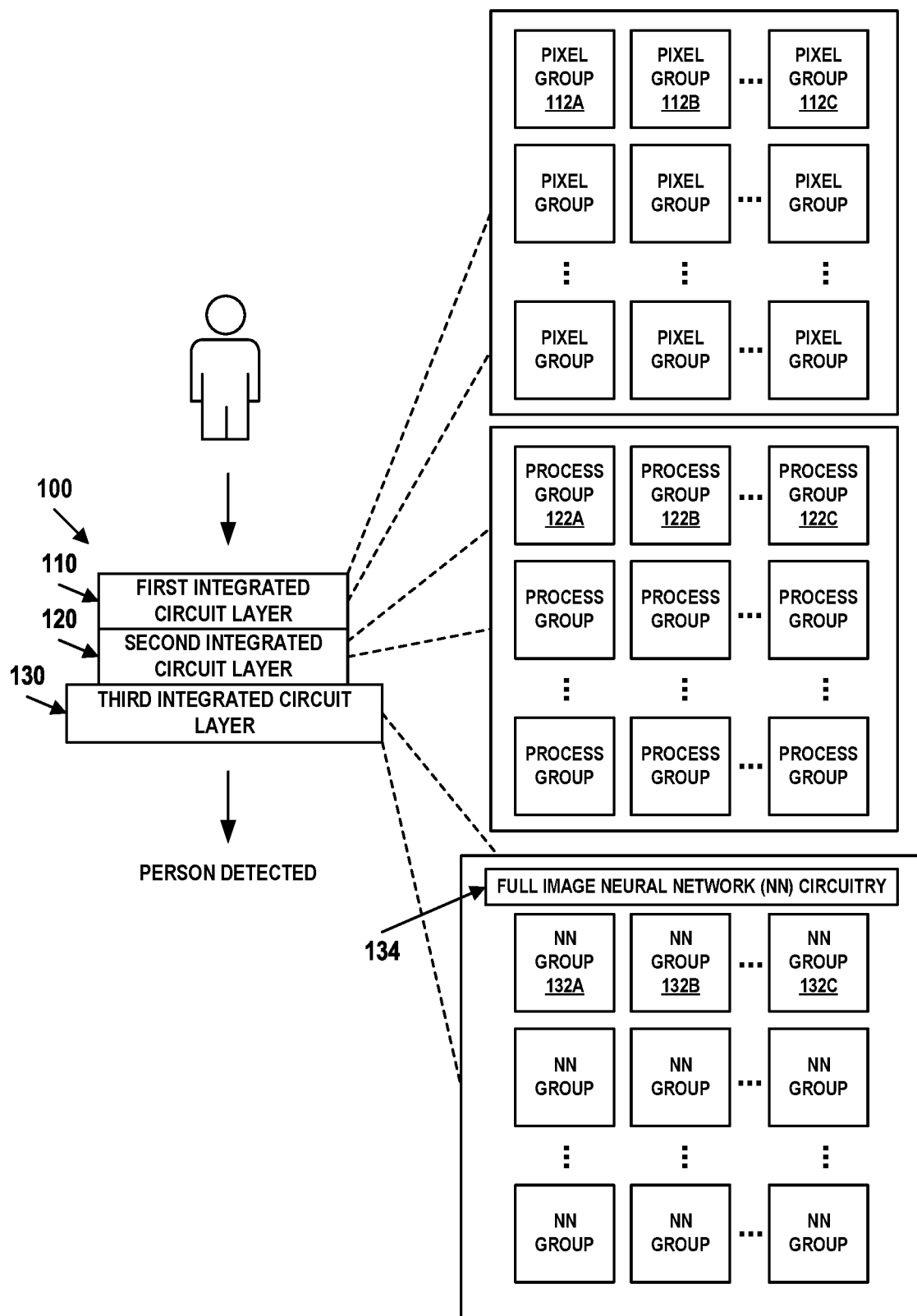
FIG. 1 illustrates a block diagram of an image sensor with three integrated circuit layers, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Image sensors may be provided on an autonomous vehicle to assist with perception of and navigation through the environment. In some cases, these image sensors may be capable of generating more data than can be timely processed by the control system of the autonomous vehicle. This may be the case, for example, when a large number of image sensors is provided on the vehicle and/or when the resolution of each image sensor is high, resulting in generation of a large amount of image data. In some cases, the amount of data transfer bandwidth available on the autonomous vehicle and/or the desired data transfer latency may limit the amount of image data that can be utilized by the control system. In other cases, the amount of processing power provided by the control system may limit the amount of image data that can be processed.

Generating and processing a larger amount of image data may, in general, be desirable as it may allow for detection, tracking, classification, and other analysis of objects within the environment. For example, capturing images at a high frame rate may allow for analysis of fast-moving objects by representing such objects without motion blur. In some implementations, the frame rate may be set to be higher than a threshold rate. For example, the threshold rate may be 50 frames per second (fps), and the frame rate may be 50 fps or higher. Similarly, capturing high-resolution images may allow for analysis of far-away objects, or for analysis of objects in a low light intensity environment. Notably, in some cases, such objects might be represented in a portion of the entire image generated by an image sensor, rather than taking up the entirety of the image.

Accordingly, an image sensor and corresponding circuitry may be configured to operate at one or more modes of operation. For example, the image sensor may be configured to generate full-resolution images (i.e., images containing each of the ROIs) and ROI images that contain therein some object of interest, but not all the ROIs. Also, for example, the image sensor may be configured to generate ROI images that contain therein some object of interest and not generate a full-resolution image. In one example, one or more ROI images may be used to determine a speed of at least one object of interest.

For example, an image sensor may be configured to operate at a high frame rate of 50 frames per second (fps). Generally, the frame rate may determine a number of the plurality of ROI images of the object of interest. For example, a configuration at a frame rate of 50 fps may result in a generation of 5 frames per millisecond (msec). These 5 frames can be used to perform image processing tasks such as, for example, reducing noise, image enhancement, image sharpening, object detection, object tracking, and so forth. Upon detecting objects of interest, ROI images of detected objects may be generated and processed further. For example, a full-resolution image may be processed in 100 msec, then a full-resolution image and one or more ROI images may be processed during the next 100 msec. This may be followed with only ROI images being processed during the next 100 msec, and so on. Such a processing cycle may be repeated.

To that end, the image sensor and corresponding circuitry may be provided that divide the image sensor into a plurality of ROIs and allow for selective readout of image data from individual ROIs. These ROIs may allow the image sensor to accommodate high frame rate and/or high resolution imaging while at the same time reducing the total amount of image data that is generated, transmitted, and analyzed. That is, the image sensor may generate image data in some ROIs (e.g., those that contain therein some object of interest) while other ROIs (e.g., those that do not contain at least one object of interest) are not used to generate image data. The full-resolution images may be analyzed to detect therein at least one object of interest, and the ROI in which the at least one object of interest is represented may subsequently be used to generate a plurality of ROI images for further analysis.

In another example, a full-resolution image may be used to determine a distance between the image sensor and at least one object of interest. When this distance crosses a threshold distance (e.g., exceeds the threshold distance or falls below the threshold distance), the ROI containing the object may be selected and used to acquire a plurality of ROI images of the object. For example, when pedestrians are determined, based on the full-resolution image, to be within the threshold distance of an autonomous vehicle, a plurality of ROI images of the pedestrians may be acquired. An ROI may additionally or alternatively be selected based on a classification of the object in the full-resolution image or other properties of the object or the full-resolution image. For example, ROI images of traffic lights or signals may be acquired based on a classification thereof. These and other attributes of at least one object of interest in a full-resolution image may be used independently or in combination to select a particular ROI.

In another example, a full-resolution image may be used to determine a speed of at least one object of interest represented within the full-resolution image. When this speed crosses a threshold speed (e.g., exceeds the threshold speed or falls below the threshold speed), the ROI containing the object may be selected and used to acquire a plurality of ROI images of the object. For example, when oncoming vehicles are determined, based on the full-resolution image, to be within the threshold speed, a plurality of ROI images of the pedestrians may be acquired. An ROI may additionally or alternatively be selected based on a classification of the at least one object of interest in the full-resolution image or other properties of the object or the full-resolution image.

In some aspects, detection of the at least one object of interest can include determining one or more of geometric properties of the at least one object of interest, position of the at least one object of interest within the environment, changes in position of the at least one object of interest overtime (e.g., velocity, acceleration, trajectory), an optical flow associated with the at least one object of interest, a classification of the at least one object of interest (e.g., car, pedestrian, vegetation, road, sidewalk, etc.), or one or more confidence values associated with results of the analyzing of the plurality of ROI images (e.g., confidence level that the object is another car), among other possibilities. The ROI used to generate the ROI images may change over time as new objects of interest are detected within different portions of new full-resolution images.

Due to their smaller size, the ROI images may be generated, transferred, and analyzed at a higher rate than full-resolution images, thus allowing, for example, the high-speed object and/or the far-away object to be more accurately analyzed (e.g., due to absence of motion blur and availability of redundant high-resolution data). Specifically, in order to capture the ROI images at the higher frame rate, analog-to-digital converters (ADCs) may be reassigned, by way of multiplexers, to the selected ROI from the other ROIs. Thus, ADCs that would otherwise be used to digitize pixels of the other ROIs may be used in combination with the ADC assigned to the selected ROI to digitize pixels of the selected ROI. Each of these ADCs may operate to digitize multiple rows or columns of the ROI in parallel. For example, four different ADC banks may, in parallel, read out four different columns of the selected ROI.

The image sensor and at least a portion of the accompanying circuitry may be implemented as layers of an integrated circuit. This integrated circuit may be communicatively connected to a central control system of the autonomous vehicle. For example, a first layer of the integrated circuit may implement the pixels of the image sensor, a second layer of the integrated circuit may implement image processing circuitry (e.g., high dynamic range (HDR) algorithms, ADCs, pixel memories, etc.) that is configured to process the signals generated by the pixels, and a third layer of the integrated circuit may implement neural network circuitry that is configured to analyze signals generated by the image processing circuitry in the second layer for object detection, classification, and other attributes.

Accordingly, in some implementations, the generation and analysis of both the full-resolution and ROI images, as well as selection of the ROI representing the at least one object of interest, may be performed by this integrated circuit. Once the full-resolution image and the ROI images are processed and the attributes of the at least one object of interest are determined, the attributes of the at least one object of interest may be transmitted to the control system of the autonomous vehicle. That is, the full-resolution image and/or the ROI images might not be transmitted to the control system, thus reducing the amount of bandwidth utilized and necessitated by communication between the integrated circuit and the control system. Notably, in some cases, a portion of the generated image data (e.g., the full-resolution image) may be transmitted along with the attributes of the at least one object of interest.

In other implementations, the analysis of the full-resolution image and the ROI images, as well as selection of the ROI representing the at least one object of interest, may be performed by the control system. The control system may thus cause the integrated circuit to generate the ROI images using the selected region of interest. While this approach may utilize more bandwidth, it may nevertheless allow the control system to obtain more images (i.e., ROI images) that represent portions of the environment that are of interest, rather than obtaining fewer full-resolution images that represent portions of the environment lacking features of interest.

The image sensor and its circuitry may additionally be configured to generate a stacked full-resolution image based on a plurality of full-resolution images. The stacked full-resolution image may be an HDR image, an image that represents a plurality of objects in-focus even though these objects are located at different depths, or an image that represents some other combination or processing of the plurality of full-resolution images. Notably, the plurality of full-resolution images may be combined by the circuitry, rather than by the control system of the vehicle. Accordingly, the plurality of full-resolution images may be generated at a higher frame rate than these images would otherwise be generated if they were each to be provided to the control system. The stacked image may contain more information than an individual full-resolution image due to the fact that information from multiple such full-resolution images is represented in the stacked image.

II. EXAMPLE SMART SENSOR

FIG. 1 is a block diagram of an example image sensor 100 with three integrated circuit layers. Image sensor 100 may use the three integrated circuit layers to detect objects. For example, image sensor 100 may capture an image that includes a person and output an indication of "person detected." In another example, image sensor 100 may capture an image and output a portion of the image that includes a vehicle that was detected by image sensor 100.

The three integrated circuit layers include a first integrated circuit layer 110, a second integrated circuit layer 120, and a third integrated circuit layer 130. First integrated circuit layer 110 is stacked on second integrated circuit layer 120, and second integrated circuit layer 120 is stacked on third integrated circuit layer 130. First integrated circuit layer 110 may be in electrical communication with second integrated circuit layer 120. For example, first integrated circuit layer 110 and second integrated circuit layer 120 may be physically connected to one another with interconnects. Second integrated circuit layer 120 may be in electrical communication with third integrated circuit layer 130. For example, second integrated circuit layer 120 and third integrated circuit layer 130 may be physically connected to one another with interconnects.

First integrated circuit layer 110 may have a same area as second integrated circuit layer 120. For example, the length and width of first integrated circuit layer 110 and second integrated circuit layer 120 may be the same while the heights may be different. Third integrated circuit layer 130 may have a larger area than first and second integrated circuit layers 110, 120. For example, third integrated circuit layer 130 may have a length and width that are both twenty percent greater than the length and the width of first and second integrated circuit layers 110, 120.

First integrated circuit layer 110 may include an array of pixel sensors that are grouped by position into pixel sensor groups (each pixel sensor group referred to as "pixel group" in FIG. 1) 112A-112C (collectively referred to by 112). For example, first integrated circuit layer 110 may include a 6400×4800 array of pixel sensors grouped into three hundred twenty by two hundred forty pixel sensor groups, where each pixel sensor group includes an array of 20×20 pixel sensors. Pixel sensor groups 112 may be further grouped to define ROIs.

Each of pixel sensor groups 112 may include 2×2 pixel sensor sub-groups. For example, each of the pixel sensor groups of 20×20 pixel sensors may include ten by ten pixel sensor sub-groups, where each pixel sensor sub-group includes a red pixel sensor in an upper left, a green pixel sensor in a lower right, a first clear pixel sensor in a lower left, and a second clear pixel sensor in an upper right, each sub-group also referred to as Red-Clear-Clear-Green (RCCG) sub-groups.

In some implementations, the size of the pixel sensor groups may be selected to increase silicon utilization. For example, the size of the pixel sensor groups may be such that more of the silicon is covered by pixel sensor groups with the same pattern of pixel sensors.

Second integrated circuit layer 120 may include image processing circuitry groups (each image processing circuitry group referred to as "process group" in FIG. 1) 122A-122C (collectively referred to by 122). For example, second integrated circuit layer 120 may include three hundred twenty by two hundred forty image processing circuitry groups. Image processing circuitry groups 122 may be configured to each receive pixel information from a corresponding pixel sensor group and further configured to perform image processing operations on the pixel information to provide processed pixel information during operation of image sensor 100.

In some implementations, each image processing circuitry group 122 may receive pixel information from a single corresponding pixel sensor group 112. For example, image processing circuitry group 122A may receive pixel information from pixel sensor group 112A and not from any other pixel group, and image circuitry processing group 122B may receive pixel information from pixel sensor group 112B and not from any other pixel group.

In some implementations, each image processing circuitry group 122 may receive pixel information from multiple corresponding pixel sensor groups 112. For example, image processing circuitry group 122A may receive pixel information from both pixel sensor groups 112A and 112B and no other pixel groups, and image processing circuitry group 122B may receive pixel information from pixel group 112C and another pixel group, and no other pixel groups.

Having image processing circuitry groups 122 receive pixel information from corresponding pixel groups may result in fast transfer of the pixel information from first integrated circuit layer 110 to second layer 120 as image processing circuitry groups 122 may physically be close to the corresponding pixel sensor groups 112. The longer the distance over which information is transferred, the longer the transfer may take. For example, pixel sensor group 112A may be directly above image processing circuitry group 122A and pixel sensor group 112A may not be directly above the image processing circuitry group 122C, so transferring pixel information from pixel sensor group 112A to the image processing circuitry group 122A may be faster than transferring pixel information from the pixel sensor group 112A to image processing circuitry group 122C, if there were interconnects between pixel sensor group 112A and image processing circuitry group 122C.

Image processing circuitry groups 122 may be configured to perform image processing operations on pixel information that image processing circuitry groups 122 receives from the pixel groups. For example, image processing circuitry group 122A may perform high dynamic range fusion on pixel information from pixel sensor group 112A and image processing circuitry group 122B may perform high dynamic range fusion on pixel information from pixel sensor group 112B. Other image processing operations may include, for example, analog to digital signal conversion and demosaicing.

Having image processing circuitry groups 122 perform image processing operations on pixel information from corresponding pixel sensor groups 112 may enable image processing operations to be performed in a distributed fashion in parallel by image processing circuitry groups 122. For example, image processing circuitry group 122A may perform image processing operations on pixel information from pixel sensor group 112A at the same time as image processing circuitry group 122B performs image processing operations on pixel information from pixel group 122B.

Third integrated circuit layer 130 may include neural network circuitry groups 132A-132C (each neural network circuitry group referred to as "NN group" in FIG. 1) 132A-132C (collectively referred to by 132) and full image neural network circuitry 134. For example, third integrated circuit layer 130 may include three hundred twenty by two hundred forty neural network circuitry groups.

Neural network circuitry groups 132 may be configured to each receive processed pixel information from a corresponding image processing circuitry group and further configured to perform analysis for object detection on the processed pixel information during operation of image sensor 100. In some implementations, neural network circuitry groups 132 may each implement a convolutional neural network (CNN).

In some implementations, each neural network circuitry group 132 may receive processed pixel information from a single corresponding image processing circuitry group 122. For example, neural network circuitry group 132A may receive processed pixel information from image processing circuitry group 122A and not from any other image processing circuitry group, and neural network circuitry group 132B may receive processed pixel information from image processing circuitry group 122B and not from any other image processing circuitry group.

In some implementations, each neural network circuitry group 132 may receive processed pixel information from multiple corresponding image processing circuitry groups 122. For example, neural network circuitry group 132A may receive processed pixel information from both image processing circuitry groups 122A and 122B and no other image processing circuitry groups, and neural network circuitry group 132B may receive processed pixel information from both image processing circuitry group 122C and another pixel group, and no other pixel groups.

Having the neural network circuitry groups 132 receive processed pixel information from corresponding image processing circuitry groups may result in fast transfer of the processed pixel information from second integrated circuit layer 120 to third integrated circuit layer 130 as neural network circuitry groups 132 may physically be close to the corresponding image processing circuitry groups 122. Again, the longer the distance over which information is transferred, the longer the transfer may take. For example, image processing circuitry group 122A may be directly above neural network circuitry group 132A so transferring processed pixel information from image processing circuitry group 122A to neural network circuitry group 132A may be faster than transferring processed pixel information from image processing circuitry group 122A to neural network circuitry group 132C, if there were interconnects between image processing circuitry group 122A and neural network circuitry group 132C.

Neural network circuitry groups 132 may be configured to detect objects from the processed pixel information that neural network circuitry groups 132 receive from image processing circuitry groups 122. For example, neural network circuitry group 132A may detect objects from the processed pixel information from image processing circuitry group 122A, and neural network circuitry group 132B may detect objects from the processed pixel information from image processing circuitry group 122B.

Having neural network circuitry groups 132 detect objects from the processed pixel information from corresponding image processing circuitry group 122 enables detection to be performed in a distributed fashion in parallel by each of neural network circuitry groups 132. For example, neural network circuitry group 132A may detect objects from processed pixel information from image processing circuitry group 122A at the same time as neural network circuitry group 132B may detect objects from processed pixel information from image processing circuitry group 122B.

In some implementations, neural network circuitry groups 132 may perform intermediate processing. Accordingly, image sensor 100 may use the three integrated circuit layers 110, 120, and 130 to perform some intermediate processing and output just an intermediate result. For example, image sensor 100 may capture an image that includes a person and output an indication of "area of interest in some region of the image," without classifying the at least one object of interest (the person). Other processing, performed outside image sensor 100 may classify the region of interest as a person.

Accordingly, the output from image sensor 100 may include some data representing the output of some convolutional neural network. This data in itself may be hard to decipher, but once it continues to be processed outside image sensor 100, the data may be used to classify the region as including a person. This hybrid approach may have an advantage of reducing required bandwidth. Accordingly, output from neural network circuitry groups 132 may include one or more of selected regions of interest for pixels representing detections, metadata containing temporal and geometrical location information, intermediate computational results prior to object detection, statistical information regarding network certainty level, and classifications of detected objects.

In some implementations, neural network circuitry groups 132 may be configured to implement CNNs with high recall and low precisions. Neural network circuitry groups 132 may each output a list of objects detected, where the object was detected, and timing of detection of the object.

Full image neural network circuitry 134 may be configured to receive, from each of neural network circuitry groups 132, data that indicates objects that neural network circuitry groups 132 detected and detect objects from the data. For example, neural network circuitry groups 132 may be unable to detect objects that are captured by multiple pixel groups, as each individual neural network circuitry group may only receive a portion of processed pixel information corresponding to the object. But, full image neural network circuitry 134 may receive data from multiple neural network circuitry groups 132 and may thus be able to detect objects sensed by multiple pixel groups. In some implementations, full image neural network circuitry 134 may implement a recurrent neural network (RNN). The neural networks may be configurable, both in regard to their architecture (number and type of layers, activation functions, etc.) as well as in regard to the actual values of neural network components (e.g. weights, biases, etc.)

In some implementations, having image sensor 100 perform processing may simplify a processing pipeline architecture, provide higher bandwidth and lower latency, allow for selective frame rate operations, reduce costs with the stacked architecture, provide higher system reliability as an integrated circuit may have fewer potential points of failure, and provide significant cost and power savings on computational resources.

III. EXAMPLE ROI ARRANGEMENT AND HARDWARE

Figure 2:
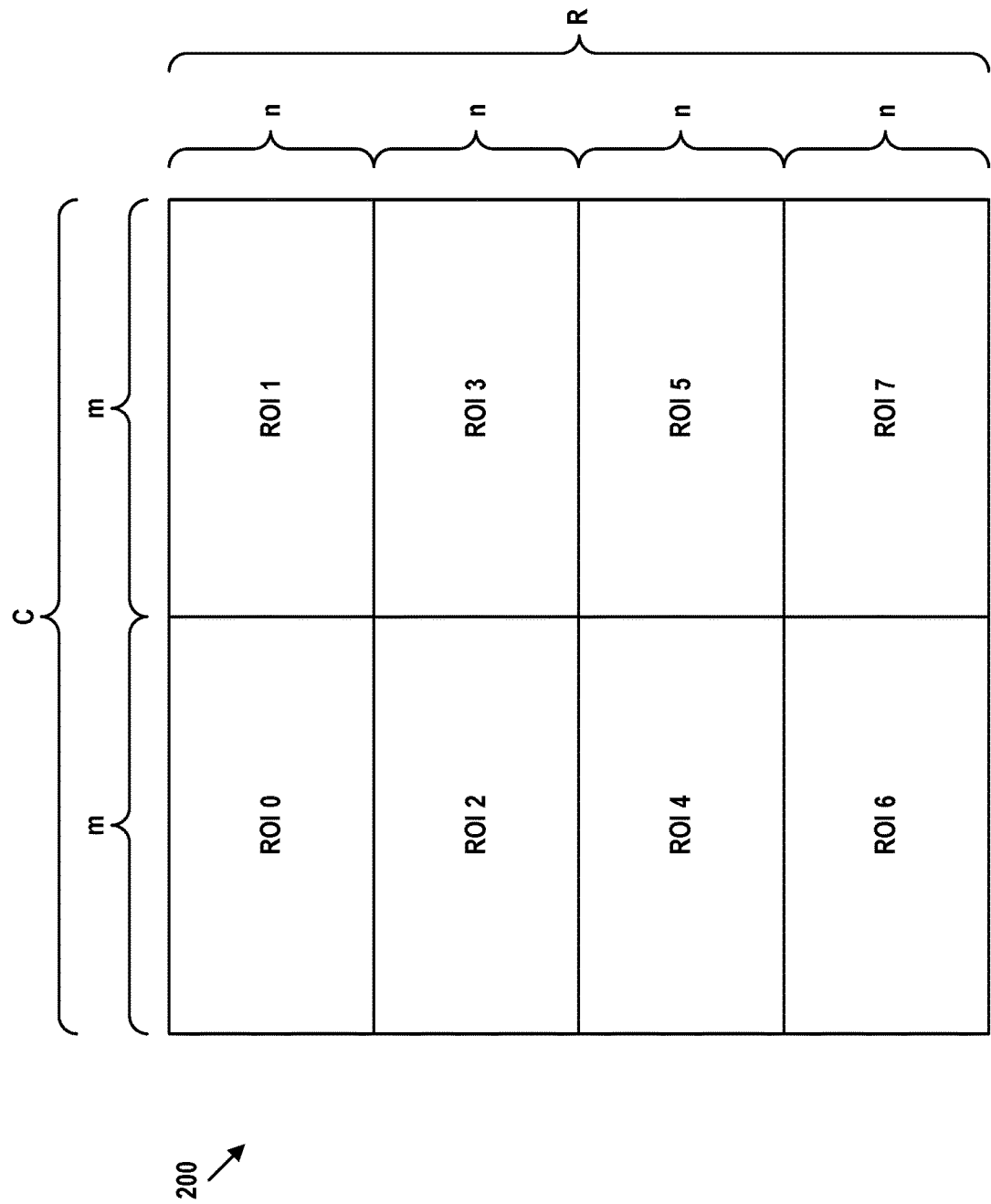
FIG. 2 illustrates an arrangement of regions of interest, in accordance with example embodiments.

FIG. 2 illustrates an example arrangement of ROIs on an image sensor. Namely, image sensor 200 may include pixels forming C columns and R rows. Image sensor 200 may correspond to the first integrated circuit layer 110. Image sensor may be divided into eight ROIs, including ROI 0, ROI 1, ROI 2, ROI 3, ROI 4, ROI 5, ROI 6, and ROI 7 (i.e., ROIs 0-7), each of which comprises m columns of pixels and n rows of pixels. Thus, C=2m and R=4n. In some implementations, each ROI may include therein multiple pixel groups 112. Alternatively, pixel groups 112 may be sized and arranged such that each pixel group is also an ROI. In some implementations, the ROIs may be arranged such that they do not collectively span the entire area of image sensor 200. Thus, a union of the ROIs may be smaller than an area of image sensor 200. Accordingly, the full-resolution image may have a higher pixel count than a union of the ROIs.

FIG. 2 illustrates the ROIs arranged into two columns, with even-numbered ROIs on the left and odd-numbered ROIs on the right. In other implementations, however, the ROIs and their numbering may be arranged in different ways. For example, ROIs 0-3 may be in the left column while ROIs 4-7 may be in the right column. In another example, the ROIs may divide image sensor 200 into 8 columns organized into a single row, with the ROIs numbered from 0-7 arranged from left to right along the 8 columns of the single row. In some implementations, the ROIs may be fixed in a given arrangement. Alternatively, the ROIs may be reconfigurable. Namely, the number of ROIs, position of each ROI, and the shape of each ROI may be reconfigurable.

IV. EXAMPLE ARCHITECTURE FOR MODES OF OPERATION

Figure 3:
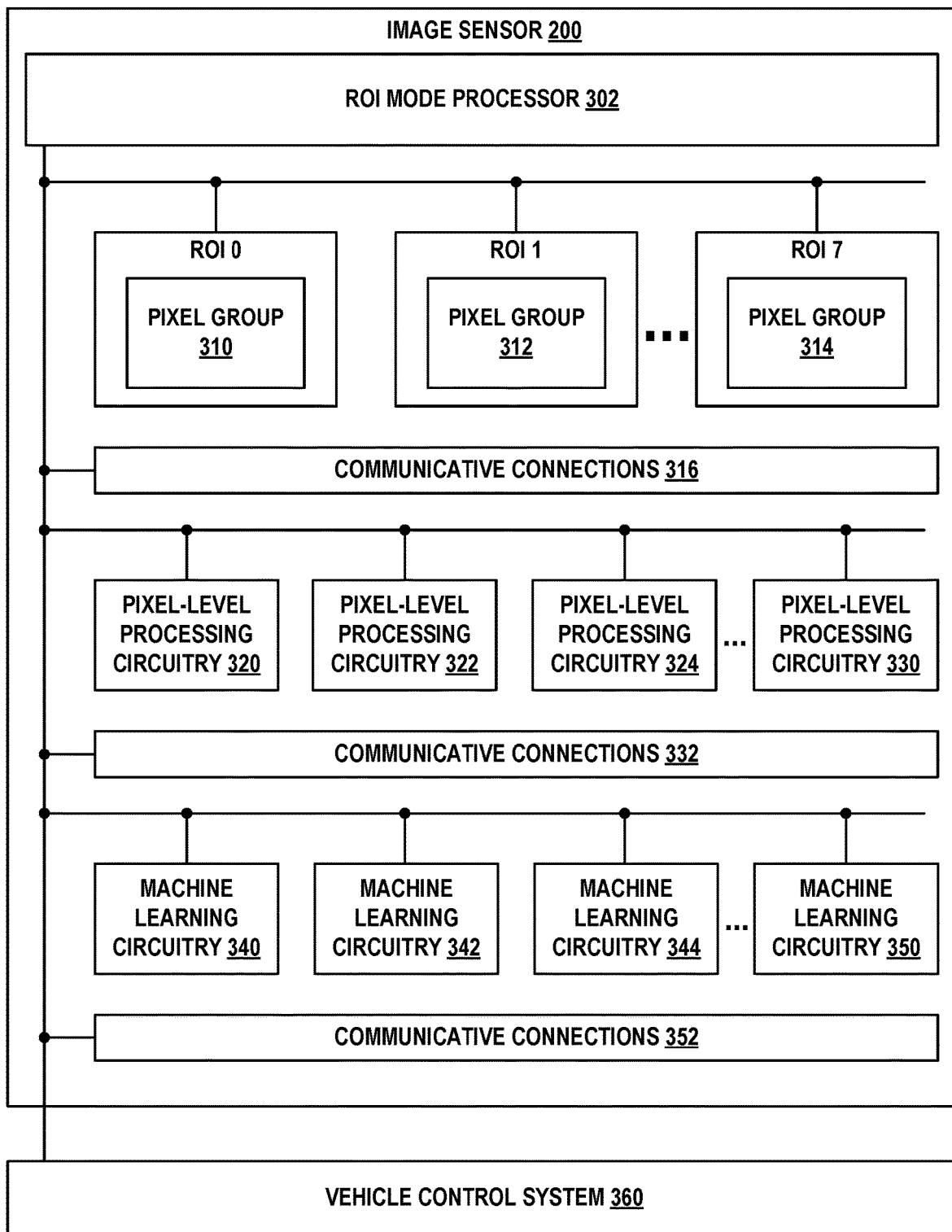
FIG. 3 illustrates an example architecture of an ROI mode processor for an image sensor, in accordance with example embodiments.

FIG. 3 illustrates an example architecture of an ROI mode processor for image sensor 200. Specifically, image sensor 200 may include ROI mode processor 302, pixel groups 310 and 312 through 314 (i.e., pixel groups 310-314) defining ROIs 0-7, respectively, and a plurality of image processing resources. The image processing resources include pixel-level processing circuitry 320, 322, and 324 through 330 (i.e., pixel-level processing circuitry 320-330), machine learning circuitry 340, 342, and 344 through 350 (i.e., machine learning circuitry 340-350), and communicative connections 316, 332, and 352. Image sensor 200 may be configured to provide image data to control system 360, which may also be considered a part of the image processing resources. Control system 360 may represent a combination of hardware and software configured to generate operations for a robotic device or an autonomous vehicle, among other possibilities.

Pixel groups 310-314 represent groupings of the pixels that make up image sensor 200. In some implementations, each of pixel groups 310-314 may correspond to one or more of pixel sensor groups 112. Pixel groups 310-314 may represent circuitry disposed in the first integrated circuit layer 110. The number of pixel sensor groups represented by each of pixel groups 310-314 may depend on the size of each of ROIs 0-7. In implementations where the number, size, and/or shape of ROIs are reconfigurable, the subset of pixel sensor groups 112 making up each of pixel groups 310-314 may vary over time based on the number, size, and/or shape of the ROIs.

Pixel-level processing circuitry 320-330 represent circuitry configured to perform pixel-level image processing operations. Pixel-level processing circuitry 320-330 may operate on outputs generated by pixel groups 310-314. The pixel-level operations may include analog-to-digital conversion, demosaicing, high dynamic range fusion, image sharpening, filtering, edge detection, and/or thresholding. Pixel-level operations may also include other types of operations that are not carried out by way of machine learning models (e.g., neural networks) provided on image sensor 200 or by control system 360. In some implementations, each of pixel-level processing circuitry 320-330 may include one or more of process groups 122, among other circuitry configured to perform pixel-level image processing operations. Thus, pixel-level circuitry 320-330 may represent circuitry disposed in the second integrated circuit layer 120.

Machine learning circuitry 340-350 may include circuitry configured to execute operations associated with one or more machine learning models. Machine learning circuitry 340-350 may operate on outputs generated by pixel groups 310-314 and/or pixel-level processing circuitry 320-330. In some implementations, each of machine learning circuitry 340-350 may correspond to one or more of neural network groups 132 and/or full image neural network circuitry 132, among other circuitry that implements machine learning models. Thus, machine learning circuitry 340-350 may represent circuitry disposed in third integrated circuit layer 130.

Communicative connections 316 may represent electrical interconnections between pixel-level processing circuitry 320-330 and pixel groups 310-314. Similarly, communicative connections 332 may represent electrical interconnections between (i) machine learning circuitry 340-350 and (ii) pixel-level processing circuitry 320-330 and/or pixel groups 310-314. Further, communicative connections 352 may represent electrical interconnections between machine learning circuitry 340-350 and control system 360. Communicative connections 316, 332, and 352 may be considered a subset of the image processing resources at least because these connections (i) facilitate the transfer of data between circuitry configured to process the image data and (ii) may be modified over time to transfer data between different combinations of the circuitry configured to process the image data.

In some implementations, communicative connections 316 may represent electrical interconnections between first integrated circuit layer 110 and second integrated circuit layer 120, and communicative connections 332 may represent electrical interconnections between second integrated circuit layer 120 and third integrated circuit layer 130. Communicative connections 352 may represent electrical interconnections between third integrated circuit layer 130 and one or more circuit boards by way of which image sensor 200 is connected to control system 360. Each of communicative connections 316, 332, and 352 may be associated with a corresponding maximum bandwidth.

Processing a full-resolution image may generally require more computing resources than processing ROIs. At a higher frame rate, a number of frames available to be processed are likely to be high. Increase in a number of frames results in an increased capacity to process the images. For example, with an increase in the number of frames available for processing, there is a higher likelihood that ROIs that include objects of interest will be detected. Accordingly, once these particular ROIs are determined, focus may be directed to the objects of interest. For example, ROIs that include these objects of interest may be further determined, and the higher frame rate can be leveraged to obtain additional ROIs that include these objects of interest. In some implementations, these additional ROIs that include objects of interest may be obtained at 150 frames per second.

Processing images at a higher frame rate may result in some associated resource cost considerations. For example, processing a large number of frames may result in greater allocation of memory resources to store the frames and/or results of the processing. This may result in higher latencies, and more computing power is likely to be dissipated. Focusing on additional ROIs that include objects of interest allows the sensor to mitigate some of these resource allocation factors and enable smart utilization of available resources.

Accordingly, ROI mode processor 302 may be configured to dynamically utilize image processing resources 316, 320-330, 340-350, 332, 352, and/or 360 (i.e., image processing resources 316-360) available to image sensor 200. Specifically, some image sensors may be configured with a fixed ROI mode processor 302. For example, in some image sensors 200, ROI mode processor 302 can be configured in a first mode of operation to process ROIs that include objects of interest, and not process a full-resolution image. Also, for example, in some other image sensors 200, ROI mode processor 302 can be configured in a second mode of operation to process ROIs that include objects of interest along with a full-resolution image. However, in some image sensors 200, ROI mode processor 302 can be configured to dynamically switch between one or more modes of operation (e.g., the first mode of operation and the second mode of operation).

Configuration of ROI mode processor 302 can depend on several factors. For example, the configuration can depend on a type of image capturing device in image sensor 200. In some implementations, the configuration can depend on a field of view of the image capturing device. For example, when image sensor 200 is installed on a vehicle, the image capturing device may have a forward view, a side view, a rear view, and so forth. In some aspects, for an image sensor 200 with an image capturing device with a forward view, the ROI mode processor 302 can be configured to operate at the second mode of operation to continue to capture and process full-resolution images to detect ROIs and objects of interest. However, for an image sensor 200 with an image capturing device with a side view and/or a rear view, the ROI mode processor 302 can be configured to operate at the first mode of operation to continue to capture and process ROI images of detected objects, and enable object tracking features.

In some implementations, the configuration of ROI mode processor 302 can depend on a time of day and/or an intensity of environmental lighting. For example, during daylight hours when object detection may be less challenging, the ROI mode processor 302 can be configured to operate in a mode to process a large number of full-resolution images. However, during night-time, foggy conditions, rainy conditions, and so forth, when the intensity of environmental lighting can be low, and there may be a greater challenge to detecting ROIs and/or objects of interest, the ROI mode processor 302 can be configured to operate in a mode to process a large number of ROIs that include objects of interest along, and intermittently process a full-resolution image.

In some implementations, the configuration of ROI mode processor 302 can depend on a type of object of interest. For example, a size, type, and/or speed of at least one object of interest may require different sets of images to be processed. For example, different modes of operation may be utilized to detect a sport utility vehicle traveling at a first speed and a motorcycle traveling at a second speed. Generally, a smaller object, and/or an object traveling at a higher speed can require faster processing, and ROI mode processor 302 can be configured to process a large number of ROIs that include objects of interest only.

ROI mode processor 302 can also be configured to determine a number and/or type of ROI images and/or full-resolution images. For example, ROI mode processor 302 can be configured to determine if a single full-resolution image with 10 ROIs needs to be processed, or 3 single full-resolution images and 3 ROIs that include objects of interest. For example, when the at least one object of interest is a pedestrian crossing a street, ROI mode processor 302 can intelligently decide to process a larger number of ROIs that include the at least one object of interest so that object tracking can be enhanced. Although processing more images may result in a higher number of false positives, this is desirable to minimize an error in detecting and/or tracking the pedestrian.

As described herein, additional factors, including traffic conditions, weather conditions, road conditions, road construction sites, speed limits, type of roadway, a type of landscape (e.g., urban, rural), a number of sensors positioned on a vehicle, availability of memory allocation, processing power of image sensors, and so forth, may cause ROI mode processor 302 to dynamically switch between one or more modes of operation.

ROI mode processor 302 may be communicatively connected to each of image processing resources 316-360, and may be aware of (e.g., may receive, access, and/or store a representation of) the capabilities of, workloads assigned to, and/or features detected by each of image processing resources 316-360. Thus, in some implementations, ROI mode processor 302 may be configured to distribute image data among image processing resources 316-360 in a manner that improves or minimizes a latency between obtaining and processing image data, improves or maximizes a utilization of image processing resources 316-360, and/or improves or maximizes a throughput of image data through image processing resources 316-360. These objectives may be quantified by one or more objective functions, each of which may be minimized or maximized (e.g., globally or locally) to achieve the corresponding objective.

V. EXAMPLE MODES OF OPERATION

Figure 4:
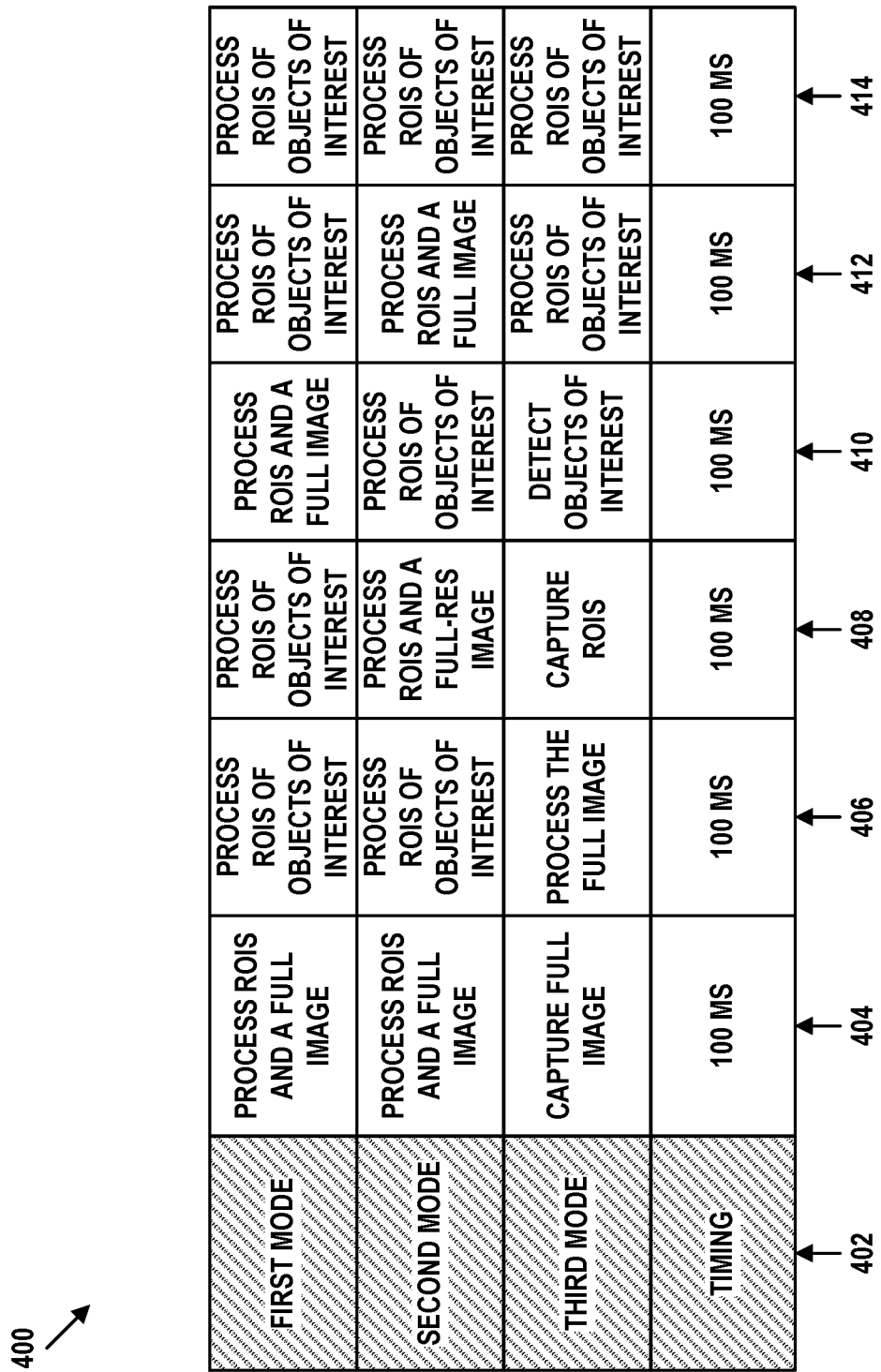
FIG. 4 illustrates an example ROI mode processor, in accordance with example embodiments.

FIG. 4 illustrates an example ROI mode processor 402. As indicated by heading column 402, the first (top-most) row of diagram 400 indicates a first mode of operation of an image processor, the second row indicates a second mode of operation of the image processor, the third row indicates a third mode of operation of the image processor, and the fourth (bottom-most) row indicates an amount of time dedicated to each operation in a duty cycle. In some implementations, a duty cycle may last 100 milliseconds (ms). The image processor may collectively represent operations carried out by second integrated circuit layer 120, third integrated circuit layer 130, and any other control systems communicatively connected to image sensor 100 or 200.

At interval 404, which may last 100 ms, an image processor operating in the first mode of operation may process a plurality of ROIs and a full-resolution image. At intervals 406 and 408, each of which may last 100 ms, the image processor may process ROIs of objects of interest only, and not process a full-resolution image. At intervals 410, 412, and 414, each of which may last 100 ms, the image processor may repeat the operations performed at intervals 404, 406, and 408. Processing of the plurality of ROIs may allow the image processor to determine various attributes of the contents of the environment represented by these images.

At interval 404, which may last 100 ms, an image processor operating in the second mode of operation may process a plurality of ROIs and a full-resolution image. At interval 406, which may last 100 ms, the image processor may process ROIs of objects of interest only, and not process a full-resolution image. At intervals 406 and 410, each of which may last 100 ms, the image processor may repeat the operations performed at intervals 404 and 406. Likewise, at intervals 412 and 414, each of which may last 100 ms, the image processor may repeat the operations performed at intervals 404 and 406, and then at 408 and 410. Processing the full-resolution image at frequent intervals may allow the image processor to determine various attributes of the contents of the environment represented by these images, especially when object detection from the full-resolution image may be somewhat challenging.

At interval 404, which may last 100 ms, an image processor operating in the third mode of operation may again acquire a full-resolution image. At interval 406, which may last 100 ms, the image processor may process the full-resolution image. In some aspects, the full-resolution image may be a stacked image that includes one or more detected objects. At interval 408, which may last 100 ms, the image processor may obtain ROIs, and at interval 410, which may last 100 ms, the image processor may detect objects of interest. At intervals 406 and 408, each of which may last 100 ms, the image processor may process ROIs of objects of interest only, and not process a full-resolution image.

Notably, at interval 404 the image processor may be configured to process ROI images captured during a preceding cycle (not shown). Notably, the amount of time for each interval and the number of ROI images captured for each full-resolution image may vary. For example, some tasks may involve the capture of more ROI images than shown (e.g., 16 ROI images per full-resolution image), or fewer ROI images (e.g. 4 ROI images per full-resolution image). Further, the size of each ROI and/or the amount of ADCs provided for the image sensor, among other factors, may be used to determine the length of the intervals during which ROI images are captured Generally, a plurality of images are generated, and the image processor may be configured to perform temporal processing on the plurality of images to track objects of interest. For example, the image processor can detect at least one object of interest moving along a trajectory, and neural network circuitry groups 132A-132C can oversample another ROI on that trajectory. There may be multiple ways to predict where the at least one object of interest may be at a given time, so the image processor may focus the processing along those expected trajectories. A larger number of images results in more information about ROIs and/or objects of interest. In some implementations, the plurality of images allow the neural network circuitry groups 132A-132C to correlate the information to make more accurate predictions. For example, temporal events that may be outside an expected norm can be processed, and the certainty that there is an object, and subsequent identification of the object, can be enhanced.

VI. EXAMPLE VEHICLE SYSTEMS

Figure 5:
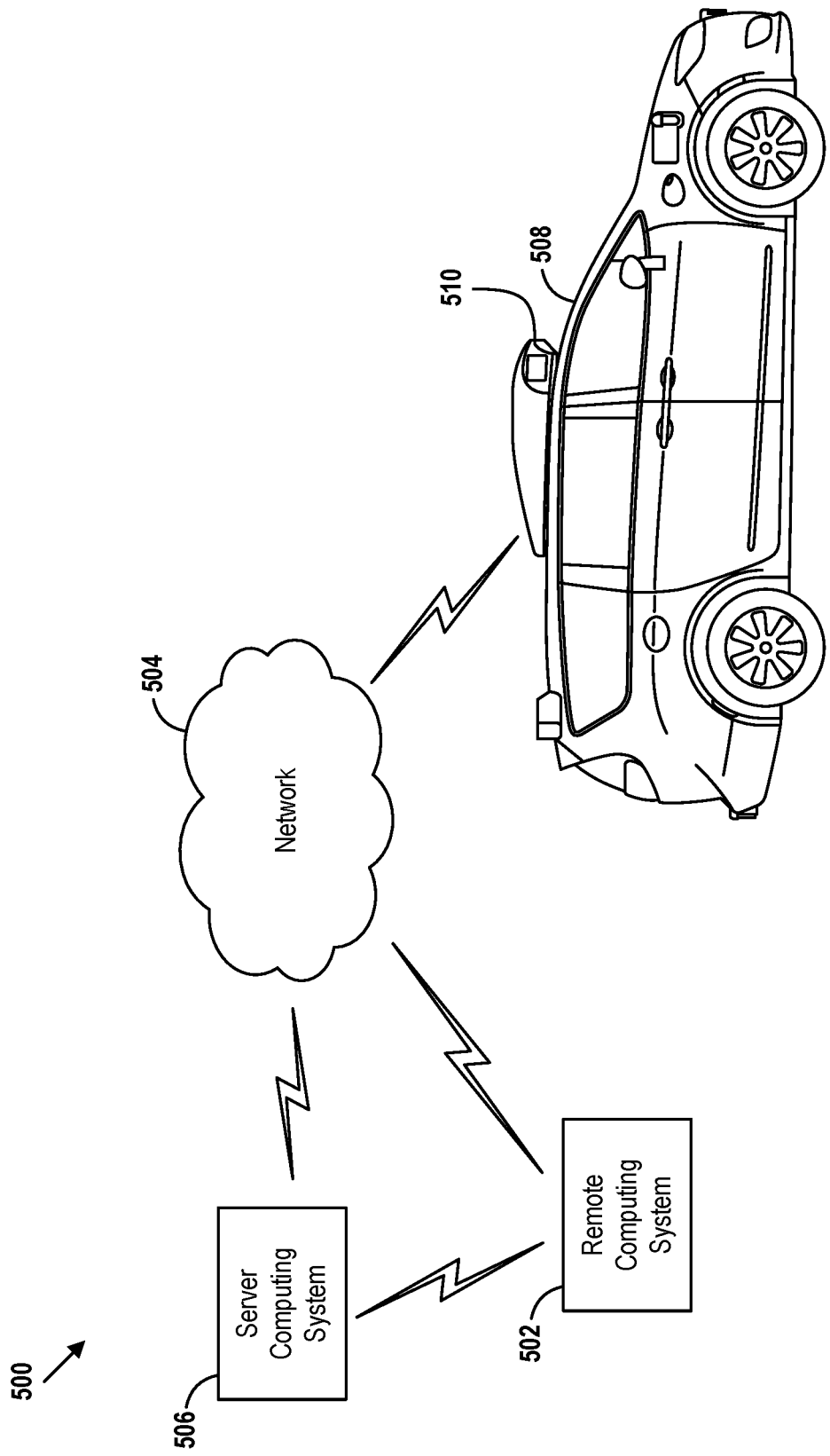
FIG. 5 is a conceptual illustration of wireless communication between various computing systems related to an autonomous vehicle, in according to example embodiments.

FIG. 5 is a conceptual illustration of wireless communication between various computing systems related to an autonomous vehicle, according to example embodiments. In particular, wireless communication may occur between remote computing system 502 and vehicle 508 via network 504. Wireless communication may also occur between server computing system 506 and remote computing system 502, and between server computing system 506 and vehicle 508.

The example vehicle 508 includes an image sensor 510. The image sensor 510 is mounted atop the vehicle 508 and includes one or more image capturing devices configured to detect information about an environment surrounding the vehicle 508, and output indications of the information. For example, image sensor 510 can include one or more cameras. The image sensor 510 can include one or more movable mounts that could be operable to adjust the orientation of one or more cameras in the image sensor 510. In one embodiment, the movable mount could include a rotating platform that could scan cameras so as to obtain information from each direction around the vehicle 508. In another embodiment, the movable mount of the image sensor 510 could be movable in a scanning fashion within a particular range of angles and/or azimuths. The image sensor 510 could be mounted atop the roof of a car, although other mounting locations are possible.

Additionally, the cameras of image sensor 510 could be distributed in different locations and need not be collocated in a single location. Furthermore, each camera of image sensor 510 can be configured to be moved or scanned independently of other cameras of image sensor 510.

Remote computing system 502 may represent any type of device related to remote assistance techniques, including but not limited to those described herein. Within examples, remote computing system 502 may represent any type of device configured to (i) receive information related to vehicle 508, (ii) provide an interface through which a human operator can in turn perceive the information and input a response related to the information, and (iii) transmit the response to vehicle 508 or to other devices. Remote computing system 502 may take various forms, such as a workstation, a desktop computer, a laptop, a tablet, a mobile phone (e.g., a smart phone), and/or a server. In some examples, remote computing system 502 may include multiple computing devices operating together in a network configuration.

Remote computing system 502 may include a processor configured for performing various operations described herein. In some embodiments, remote computing system 502 may also include a user interface that includes input/output devices, such as a touchscreen and a speaker. Other examples are possible as well.

Network 504 represents infrastructure that enables wireless communication between remote computing system 502 and vehicle 508. Network 504 also enables wireless communication between server computing system 506 and remote computing system 502, and between server computing system 506 and vehicle 508.

The position of remote computing system 502 can vary within examples. For instance, remote computing system 502 may have a remote position from vehicle 508 that has a wireless communication via network 504. In another example, remote computing system 502 may correspond to a computing device within vehicle 508 that is separate from vehicle 508, but with which a human operator can interact while a passenger or driver of vehicle 508. In some examples, remote computing system 502 may be a computing device with a touchscreen operable by the passenger of vehicle 508.

In some embodiments, operations described herein that are performed by remote computing system 502 may be additionally or alternatively performed by vehicle 508 (i.e., by any system(s) or subsystem(s) of vehicle 508). In other words, vehicle 508 may be configured to provide a remote assistance mechanism with which a driver or passenger of the vehicle can interact.

Server computing system 506 may be configured to wirelessly communicate with remote computing system 502 and vehicle 508 via network 504 (or perhaps directly with remote computing system 502 and/or vehicle 508). Server computing system 506 may represent any computing device configured to receive, store, determine, and/or send information relating to vehicle 508 and the remote assistance thereof. As such, server computing system 506 may be configured to perform any operation(s), or portions of such operation(s), that is/are described herein as performed by remote computing system 502 and/or vehicle 508. Some embodiments of wireless communication related to remote assistance may utilize server computing system 506, while others may not.

Server computing system 506 may include one or more subsystems and components similar or identical to the subsystems and components of remote computing system 502 and/or vehicle 508, such as a processor configured for performing various operations described herein, and a wireless communication interface for receiving information from, and providing information to, remote computing system 502 and vehicle 508.

In line with the discussion above, a computing system (e.g., remote computing system 502, server computing system 506, or a computing system local to vehicle 508) may operate to use a camera to capture images of the environment of an autonomous vehicle. In general, at least one computing system will be able to analyze the images and possibly control the autonomous vehicle.

In some embodiments, to facilitate autonomous operation, a vehicle (e.g., vehicle 508) may receive data representing objects in an environment in which the vehicle operates (also referred to herein as "environment data") in a variety of ways. A sensor system on the vehicle may provide the environment data representing objects of the environment. For example, the vehicle may have various sensors, including a camera. Each of these sensors may communicate environment data to a processor in the vehicle about information each respective sensor receives.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, activities and/or objects at long distances on a freeway, flashing school bus stop signs, flashing lights on emergency vehicles, and other various objects detected in the captured environment data.

The processor may be configured to determine a detection confidence. The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the threshold.

The processor may be configured to determine a mode of operation for the image sensor 510 based on the detection confidence. For example, when the at least one object has the detection confidence below the threshold based on being unable to identify the object with a detection confidence above the threshold, the image sensor may process additional ROIs that include the at least one object, along with a full-resolution image of the environment. Also, for example, a number of successive duty cycles when the additional ROIs that include the at least one object are processed may vary with the detection confidence. A higher detection confidence may be associated with processing fewer ROIs in successive duty cycles, while a lower detection confidence may be associated with processing more ROIs and more full-resolution images in successive duty cycles.

VII. EXAMPLE PEER-TO-PEER SENSOR ARCHITECTURE

Figure 6:
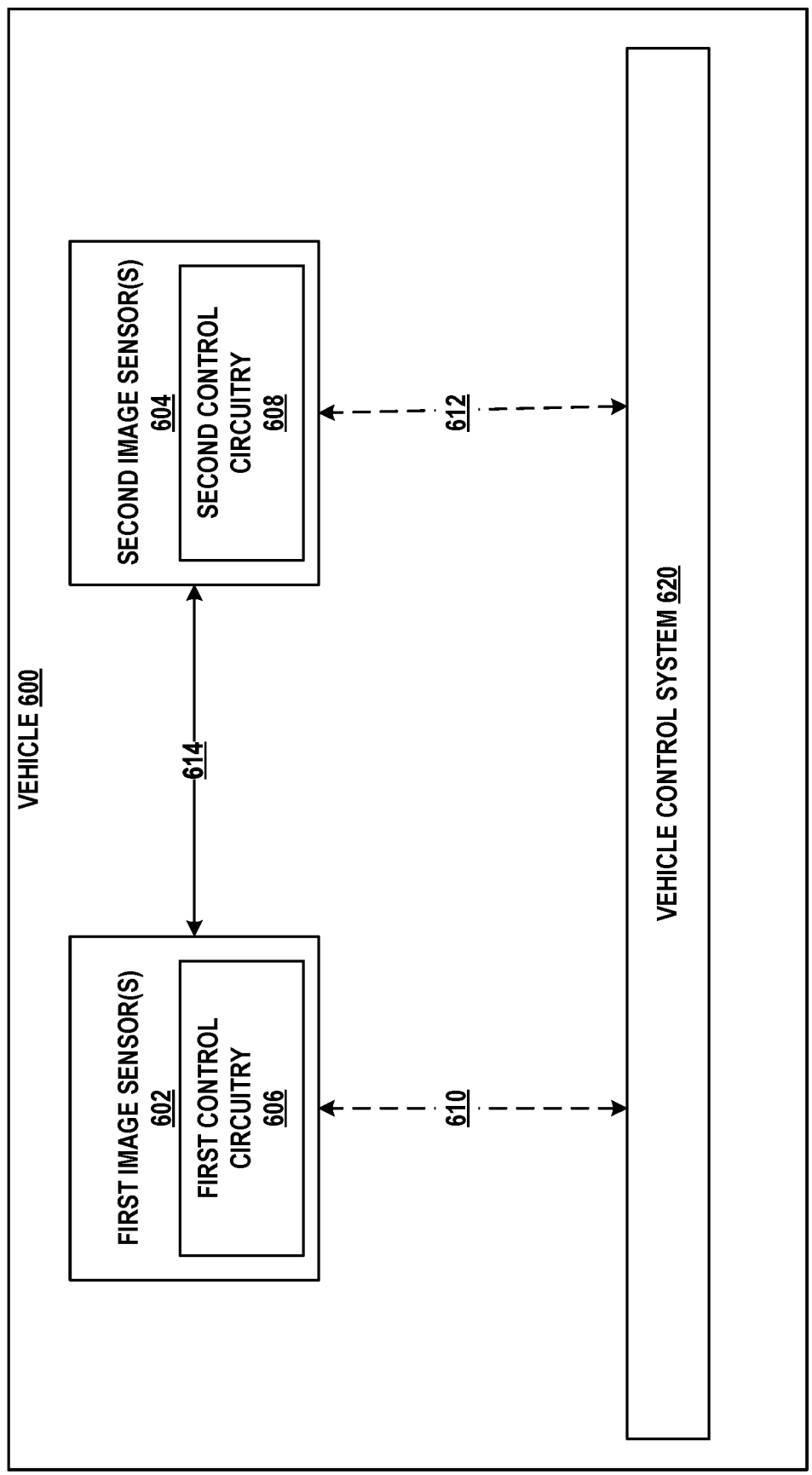
FIG. 6 illustrates an example sensor architecture in which various types of sensors are configured to share one or more of ROI information with one another via a peer-to-peer network, in accordance with example embodiments.

FIG. 6 illustrates an example sensor architecture in which various two or more sensors are configured to share one or more of ROI information with one another via a peer-to-peer network. In some cases, such sharing by way of the peer-to-peer network may be performed independently and/or without involvement of a central control system. Specifically, FIG. 6 includes vehicle 600, which may represent an autonomous vehicle (e.g., vehicle 500) or a robotic device, among other possibilities. Vehicle 600 may include vehicle control system 620, first image sensor(s) 602, and second image sensor(s) 604.

Vehicle control system 620 may represent hardware and/or software configured to control operations of vehicle 600 based on data from the first image sensor(s) 602, and second image sensor(s) 604. Thus, vehicle control system 620 may be communicatively connected to first image sensor(s) 602 by way of connection 610, and to second image sensor(s) 604 by way of connection 612. Each of the first image sensor(s) 602 and second image sensor(s) 604 may include corresponding first control circuitry 606, and second control circuitry 608, respectively, configured to process sensor data from the corresponding sensor and handle communications with vehicle control system 620 and the other sensors. In some implementations, first control circuitry 606, and second control circuitry 608 may be implemented as one or more layers of a respective integrated circuit that forms the respective sensor (e.g., as shown in FIG. 3).

Further, each of first image sensor(s) 602, and second image sensor(s) 604 may be interconnected with one another by way of a peer-to-peer network of connections. Specifically, the first image sensor(s) 602 may be communicatively connected to the second image sensor(s) 604 by way of peer-to-peer connection 614.

Each of first image sensor(s) 602 and second image sensor(s) 604 may be configured to communicate with one another independently of vehicle control system 620, for example, by way of peer-to-peer connection 614. Accordingly, the first image sensor(s) 602 and second image sensor(s) 604 may share ROI information with one another without involvement by vehicle control system 620. For example, the first control circuitry 606 can be configured to: (i) obtain the full-resolution image, (ii) determine information associated with the at least one object of interest, (iii) select the second image sensor from a plurality of image sensors based on a pose of the second image sensor with respect to the environment and the expected position of the at least one object of interest within the environment at the second time, (iv) determine the particular ROI further based on selection of the second image sensor, and (v) transmit an indication of the particular ROI to the second control circuitry 608 by way of a peer-to-peer connection 614 between first image sensor(s) 602 and second image sensor(s) 604. The second control circuitry 608 can be configured to receive the indication of the particular ROI from the first control circuitry 606 and obtain the plurality of ROI sensor data in response to reception of the indication.

As another example, the first control circuitry 606 can be configured to: (i) obtain the full-resolution image, (ii) determine information associated with the at least one object of interest, and (iii) broadcast the expected position of the at least one object of interest to second image sensor(s) 604 by way of peer-to-peer connection 614 between first image sensor(s) 602 and second image sensor(s) 604. The second control circuitry 608 can be configured to determine, in response to reception of the broadcast and based on a pose of the second image sensor(s) 604 with respect to the environment and the expected position of the at least one object of interest within the environment, the particular ROI of the second image sensor(s) 604 expected to view the at least one object of interest at the second time and obtain the plurality of ROI sensor data in response to determining the particular ROI. In some implementations, first control circuitry 606 may detect at least one object of interest that is moving within the environment. Accordingly, first control circuitry 606 may generate an ROI that includes the detected object of interest, and transmit the ROI to the second image sensor(s) 604 with a request to capture a larger temporal image of the environment. In some implementations, one or more cameras may have a wider field of view, and such a wide view of the environment may not be desirable for image processing. Accordingly, the image from a camera having a wider field of view can be cropped to include ROIs.

Although first image sensor(s) 602 and second image sensor(s) 604 may be in communication with a server (e.g., server computing system 506), it may be desirable to configure first image sensor(s) 602 and second image sensor(s) 604 to make some decisions related to object detection and object tracking. For example, if first image sensor(s) 602 and second image sensor(s) 604 were to transmit each full-resolution image and/or ROIs to the server, there would be latencies in performing the image processing tasks, and a position of the at least one object of interest may not be predicted with high accuracy. Accordingly, when at least one object of interest is determined to be in motion within the environment, first image sensor(s) 602 can be configured to detect the at least one object of interest in a first frame, sample the next frame, and generate a trajectory for the motion of the object within the environment. This information, included in relevant ROI images, can then be transmitted to the second image sensor(s) 604 for further tracking. For example, second image sensor(s) 604 may receive the information related to the trajectory, capture an image of the environment where the at least one object of interest is predicted to be located based on the trajectory, and process only the pixels in the image that correspond to the ROI that includes the predicted location, instead of a full-resolution image.

Such direct, peer-to-peer communication of ROI images among sensors may allow these sensors to quickly react to changes in the environment and capture high-quality sensor data that is useful for determining how to operate vehicle 600. By avoiding communicating by way of vehicle control system 620, the transmission path of the information may be shortened, thus reducing communication delay. Further, by selecting the ROI, detecting at least one object of interest, and/or determining one or more ROIs that include the at least one object of interest using first control circuitry 606, and second control circuitry 608, the speed with which the ROI is selected, at least one object of interest is detected, additional ROIs are processed, and/or the mode of operation is determined, may be independent of the processing load on vehicle control system, thereby further reducing the delay.

Although first image sensor(s) 602 and second image sensor(s) 604 may be configured to communicate directly with one another to directly share certain information, these sensors may also share information with vehicle control system 620. For example, each sensor may share with vehicle control system 620 the results of various sensor data processing operations executed on the captured sensor data, along with at least portions of the sensor data itself. In general, first image sensor(s) 602, and second image sensor(s) 604 may share with vehicle control system 620 information useful in operating vehicle 600, and may share directly with one another information regarding where and how to capture sensor data. Thus, the peer-to-peer sensor network may allow vehicle 600 to avoid using vehicle control system 620 as a communication intermediary for communication of a certain type between first image sensor(s) 602, and second image sensor(s) 604.

In some implementations, the first image sensor(s) 602 may be configured to capture image data of an environment. Based on or in response to capturing the image data, first image sensor(s) 602 may be configured to transmit the image data to vehicle control system 620. This transmission may be executed by way of connection 610.

Based on or in response to reception of the image data, vehicle control system 620 may be configured to select a mode of operation for the first image sensor(s) 602. The selected mode of operation may be based on the initial image data captured, and may be selected to improve the quality of future images captured in the environment represented by the initial image data. Based on or in response to selection of the mode of operation, vehicle control system 620 may be configured to transmit the mode of operation to the first image sensor(s) 602. Again, this transmission may be executed by way of connection 610. In alternative implementation, rather than relying on vehicle control system 620 to select the mode of operation, this operation may be performed by the first control circuitry 606 provided as part of the first image sensor(s) 602.

Based on or in response to selection and/or reception of the mode of operation, first image sensor(s) 602 may be configured to adjust a number of ROIs and full-resolution images to be processed. By doing so, the first image sensor(s) 602 may capture additional image data, which may have higher quality (e.g., has a better exposure, magnification, white balance, etc.) than the initial image data captured. Thus, based on or in response to adjusting the mode of operation, the first image sensor(s) 602 may be configured to capture the additional image data.

Based on or in response to capturing the additional image data, first image sensor(s) 602 may be configured to detect at least one object of interest within the additional image data. This detection may be performed by the first control circuitry 606 that is provided as part of the first image sensor(s) 602. Based on or in response to detecting at least one object of interest, first image sensor(s) 602 may be configured to select another sensor and/or an ROI of that sensor expected to view the at least one object of interest at a future time.

To that end, the first control circuitry 606 of the first image sensor(s) 602 may be configured to predict, based on attributes of the objects of interest, a future location relative to vehicle 600 at which the at least one object of interest will be observed. The control circuitry may also determine which of the sensors on vehicle 600 will view (e.g., in the case of fixed sensors) and/or may be repositioned to view (e.g., in the case of sensors having adjustable poses) the at least one object of interest at the future time. Further, the first control circuitry 606 may determine a particular ROI of the determined sensor in which the at least one object of interest will appear.

Based on selection of the sensor and/or the ROI thereof, first image sensor(s) 602 may be configured to transmit, to second image sensor(s) 604, the ROI selection, the attributes of the at least one object of interest, and/or the mode of operation used by first image sensor(s) 602. Based on or in response to reception of the ROI selection, the attributes of the at least one object of interest, and/or the mode of operation, second image sensor(s) 604 may be configured to determine a mode of operation to be used by second image sensor(s) 604 for scanning the at least one object of interest and adjust the mode of operation thereof accordingly. Based on or in response to adjustment of the mode of operation, a second image sensor(s) 604 may be configured to capture ROI image data of the selected ROI.

VIII. ADDITIONAL EXAMPLE OPERATIONS

Figure 7:
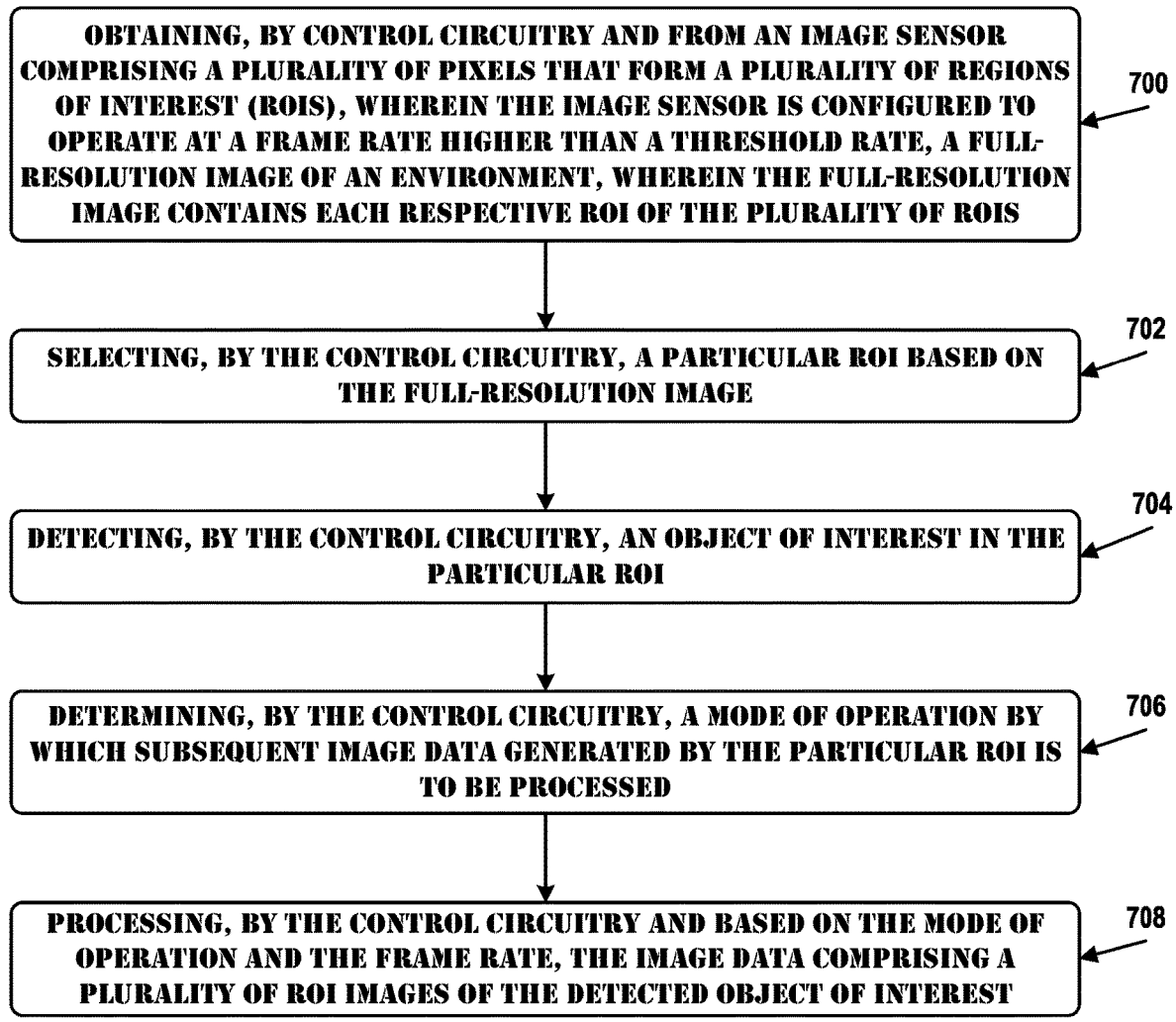
FIG. 7 illustrates a flow chart, in accordance with example embodiments.

FIG. 7 illustrates a flow chart of operations related to processing ROI images. The operations may be carried out by image sensor 100, image sensor 200, the components thereof, and/or the circuitry associated therewith, among other possibilities. However, the operations can also be carried out by other types of devices or device subsystems. For example, the process could be carried out by a server device, an autonomous vehicle, and/or a robotic device.

The embodiments of FIG. 7 may be simplified by the removal of any one or more of the features shown therein. Further, these embodiments may be combined with features, aspects, and/or implementations of any of the previous figures or otherwise described herein.

Block 700 may involve obtaining, by control circuitry and from an image sensor comprising a plurality of pixels that form a plurality of regions of interest (ROIs), wherein the image sensor is configured to operate at a frame rate higher than a threshold rate, a full-resolution image of an environment, wherein the full-resolution image contains each respective ROI of the plurality of ROIs.

Block 702 may involve selecting, by the control circuitry, a particular ROI based on the full-resolution image.

Block 704 may involve detecting, by the control circuitry, at least one object of interest in the particular ROI.

Block 706 may involve determining, by the control circuitry, a mode of operation by which subsequent image data generated by the particular ROI is to be processed.

Block 708 may involve processing, by the control circuitry and based on the mode of operation and the frame rate, the image data comprising a plurality of ROI images of the detected object of interest.

In some embodiments, the processing, based on the mode of operation and the frame rate, of the image data, may include generating, during one or more next duty cycles, the plurality of ROI images of the at least one object of interest instead of obtaining an additional full-resolution image.

In some embodiments, the processing, based on the mode of operation and the frame rate, of the image data, may include generating, during one or more next duty cycles, the plurality of ROIs and an additional full-resolution image comprising one or more objects of interest.

In some embodiments, the processing, based on the mode of operation and the frame rate, of the image data, may include generating, during one or more next duty cycles, a plurality of additional full-resolution images comprising one or more objects of interest.

In some embodiments, the system may include a vehicle, and the mode of operation may be based on a position of the image sensor on the vehicle.

In some embodiments, a number of the plurality of ROI images of the at least one object of interest may be based on the frame rate.

In some embodiments, the image sensor may be configured with a predetermined mode of operation.

In some embodiments, the processing of the image data may include performing one or more image processing tasks on the plurality of ROI images of the at least one object of interest.

In some embodiments, the operations may further include comparing a distance between the image sensor and the at least one object of interest represented within the full-resolution image to a threshold distance. The operations also include, based on results of comparing the distance to the threshold distance, obtaining the plurality of ROI images of the at least one object of interest instead of obtaining an additional full-resolution image.

In some embodiments, the operations may further include comparing a speed of the at least one object of interest represented within the full-resolution image to a threshold speed. The operations also include, based on results of comparing the speed to the threshold speed, obtaining the plurality of ROI images of the at least one object of interest instead of obtaining an additional full-resolution image.

In some embodiments, the operations may further include providing, to a server, the plurality of ROI images of the at least one object of interest and a full-resolution image comprising the at least one object of interest.

In some embodiments, the full-resolution image may be obtained at a first time, and the operations may further include transmitting, to a second image sensor, the image data of the at least one object of interest within the environment. The operations also include determining the particular ROI from a plurality of ROIs of the second image sensor. The particular ROI may correspond to an expected position of the at least one object of interest within the environment at a second time later than the first time. The operations also include obtaining, from the second sensor, a plurality of ROI sensor data from the particular ROI instead of obtaining full-resolution sensor data that contains each respective ROI of the plurality of ROIs.

In some embodiments, a first subset of the control circuitry may form part of the image sensor. A second subset of the control circuitry may form part of the second image sensor. The first subset of the control circuitry may be configured to: (i) obtain the full-resolution image, (ii) determine information associated with the at least one object of interest, (iii) select the second image sensor from a plurality of image sensors based on a pose of the second image sensor with respect to the environment and the expected position of the at least one object of interest within the environment at the second time, (iv) determine the particular ROI further based on selection of the second image sensor, and (v) transmit an indication of the particular ROI to the second subset of the control circuitry by way of a peer-to-peer connection between the image sensor and the second image sensor. The second subset of the control circuitry may be configured to receive the indication of the particular ROI from the first subset of the control circuitry and obtain the plurality of ROI sensor data in response to reception of the indication.

In some embodiments, a first subset of the control circuitry may form part of the image sensor. A second subset of the control circuitry may form part of the second image sensor. The first subset of the control circuitry may be configured to: (i) obtain the full-resolution image, (ii) determine information associated with the at least one object of interest, and (iii) broadcast the expected position of the at least one object of interest to a plurality of image sensors that includes the second image sensor by way of a plurality of peer-to-peer connections between the image sensor and the plurality of image sensors. The second subset of the control circuitry may be configured to determine, in response to reception of the broadcast and based on a pose of the second image sensor with respect to the environment and the expected position of the at least one object of interest within the environment, the particular ROI of the second image sensor expected to view the at least one object of interest at the second time and obtain the plurality of ROI sensor data in response to determining the particular ROI.

In some embodiments, the system may include a vehicle. The system may further include a control system configured to control the vehicle based on data generated by the image sensor. The transmitting of the image data, the determining of the particular ROI, and the obtaining of the plurality of ROI sensor data may be performed independently of the control system.

In some embodiments, the detecting of the at least one object of interest may include determining one or more of: (i) geometric properties of the at least one object of interest, (ii) an actual position of the at least one object of interest within the environment, (iii) a speed of the at least one object of interest, (iv) an optical flow associated with the at least one object of interest, (v) a classification of the at least one object of interest, or (vi) one or more confidence values associated with results of the processing of the image data.

In some embodiments, the control circuitry may implement an artificial neural network configured to process the image data by (i) analyzing the image data using the neural network circuitry and (ii) generating, by way of the neural network circuitry, neural network output data related to results of the processing of the image data.

In some embodiments, the control circuitry may be configured to switch between operating in one of three different modes based on conditions within the environment. A first mode of the three different modes may involve obtaining a first plurality of full-resolution images at a first frame rate. A second mode of the three different modes may involve alternating between obtaining the full-resolution image at the first frame rate and obtaining the plurality of ROI images at a second frame rate higher than the first frame rate. A third mode of the three different modes may involve (i) obtaining a second plurality of full-resolution images at a third frame rate higher than the first frame rate and (ii) combining the second plurality of full-resolution images to generate a stacked full-resolution image.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for the purpose of illustration and are not intended to be limiting, with the true scope being indicated by the following claims.

What is claimed is:

1. A system comprising:
    an image sensor comprising a plurality of pixels that form a plurality of regions of interest (ROIs), wherein the image sensor is configured to operate at a frame rate higher than a threshold rate;
    an image processing resource; and
    control circuitry configured to perform operations comprising:
        obtaining, from the image sensor, a full-resolution image of an environment, wherein the full-resolution image contains each respective ROI of the plurality of ROIs;
        selecting a particular ROI based on the full-resolution image;
        detecting at least one object of interest in the particular ROI;
        determining a mode of operation by which subsequent image data generated by the particular ROI is to be processed, and
        processing, based on the mode of operation and the frame rate, the image data comprising a plurality of ROI images of the at least one object of interest.

2. The system of claim 1, wherein the processing, based on the mode of operation and the frame rate, of the image data, comprises generating, during one or more next duty cycles, the plurality of ROI images of the at least one object of interest instead of obtaining an additional full-resolution image.

3. The system of claim 1, wherein the processing, based on the mode of operation and the frame rate, of the image data, comprises generating, during one or more next duty cycles, the plurality of ROIs and an additional full-resolution image comprising one or more objects of interest.

4. The system of claim 1, wherein the processing, based on the mode of operation and the frame rate, of the image data, comprises generating, during one or more next duty cycles, a plurality of additional full-resolution images comprising one or more objects of interest.

5. The system of claim 1, further comprising a vehicle, and wherein the mode of operation is based on a position of the image sensor on the vehicle.

6. The system of claim 1, wherein a number of the plurality of ROI images of the at least one object of interest is based on the frame rate.

7. The system of claim 1, wherein the image sensor is configured with a predetermined mode of operation.

8. The system of claim 1, wherein the processing of the image data comprises performing one or more image processing tasks on the plurality of ROI images of the at least one object of interest.

9. The system of claim 1, wherein the operations further comprise:
    comparing a distance between the image sensor and the at least one object of interest represented within the full-resolution image to a threshold distance; and
    based on results of comparing the distance to the threshold distance, obtaining the plurality of ROI images of the at least one object of interest instead of obtaining an additional full-resolution image.

10. The system of claim 1, wherein the operations further comprise:
    comparing a speed of the at least one object of interest represented within the full-resolution image to a threshold speed; and
    based on results of comparing the speed to the threshold speed, obtaining the plurality of ROI images of the at least one object of interest instead of obtaining an additional full-resolution image.

11. The system of claim 1, wherein the operations further comprise:
    providing, to a server, the plurality of ROI images of the at least one object of interest and a full-resolution image comprising the at least one object of interest.

12. The system of claim 1, wherein the full-resolution image is obtained at a first time, and wherein processing the image data comprises:
    transmitting, to a second image sensor, the image data of the at least one object of interest within the environment;
    determining the particular ROI from a plurality of ROIs of the second image sensor, wherein the particular ROI corresponds to an expected position of the at least one object of interest within the environment at a second time later than the first time; and
    obtaining, from the second sensor, a plurality of ROI sensor data from the particular ROI instead of obtaining full-resolution sensor data that contains each respective ROI of the plurality of ROIs.

13. The system of claim 12, wherein a first subset of the control circuitry forms part of the image sensor, wherein a second subset of the control circuitry forms part of the second image sensor, wherein the first subset of the control circuitry is configured to: (i) obtain the full-resolution image, (ii) determine information associated with the at least one object of interest, (iii) select the second image sensor from a plurality of image sensors based on a pose of the second image sensor with respect to the environment and the expected position of the at least one object of interest within the environment at the second time, (iv) determine the particular ROI further based on selection of the second image sensor, and (v) transmit an indication of the particular ROI to the second subset of the control circuitry by way of a peer-to-peer connection between the image sensor and the second image sensor, and wherein the second subset of the control circuitry is configured to receive the indication of the particular ROI from the first subset of the control circuitry and obtain the plurality of ROI sensor data in response to reception of the indication.

14. The system of claim 12, wherein a first subset of the control circuitry forms part of the image sensor, wherein a second subset of the control circuitry forms part of the second image sensor, wherein the first subset of the control circuitry is configured to: (i) obtain the full-resolution image, (ii) determine information associated with the at least one object of interest, and (iii) broadcast the expected position of the at least one object of interest to a plurality of image sensors that includes the second image sensor by way of a plurality of peer-to-peer connections between the image sensor and the plurality of image sensors, wherein the second subset of the control circuitry is configured to determine, in response to reception of the broadcast and based on a pose of the second image sensor with respect to the environment and the expected position of the at least one object of interest within the environment, the particular ROI of the second image sensor expected to view the at least one object of interest at the second time and obtain the plurality of ROI sensor data in response to determining the particular ROI.

15. The system of claim 12, further comprising:
    a vehicle; and
    a control system configured to control the vehicle based on data generated by the image sensor, wherein the transmitting of the image data, the determining of the particular ROI, and the obtaining of the plurality of ROI sensor data are performed independently of the control system.

16. The system of claim 1, wherein the detecting of the at least one object of interest comprises determining one or more of: (i) geometric properties of the at least one object of interest, (ii) an actual position of the at least one object of interest within the environment, (iii) a speed of the at least one object of interest, (iv) an optical flow associated with the at least one object of interest, (v) a classification of the at least one object of interest, or (vi) one or more confidence values associated with results of the processing of the image data.

17. The system of claim 1, wherein the control circuitry comprises neural network circuitry, and wherein processing of the image data comprises:
    analyzing the image data using the neural network circuitry; and
    generating, by way of the neural network circuitry, neural network output data related to results of the processing of the image data.

18. The system of claim 1, wherein the full-resolution image is obtained at a first frame rate, and wherein the plurality of ROI images of the detected object are obtained at a second frame rate higher than the first frame rate.

19. A method comprising:
    obtaining, by control circuitry and from an image sensor comprising a plurality of pixels that form a plurality of regions of interest (ROIs), wherein the image sensor is configured to operate at a frame rate higher than a threshold rate, a full-resolution image of an environment, wherein the full-resolution image contains each respective ROI of the plurality of ROIs;

selecting, by the control circuitry, a particular ROI based on the full-resolution image;

detecting, by the control circuitry, at least one object of interest in the particular ROI;

determining, by the control circuitry, a mode of operation by which subsequent image data generated by the particular ROI is to be processed; and processing, by the control circuitry and based on the mode of operation and the frame rate, the image data comprising a plurality of ROI images of the detected object of interest.

20. A non-transitory computer readable storage medium having stored thereon instructions that, when executed by a computing device, cause the computing device to perform operations comprising:

obtaining, from an image sensor comprising a plurality of pixels that form a plurality of regions of interest (ROIs), wherein the image sensor is configured to operate at a frame rate higher than a threshold rate, a full-resolution image of an environment, wherein the full-resolution image contains each respective ROI of the plurality of ROIs;

selecting a particular ROI based on the full-resolution image, detecting at least one object of interest in the particular ROI;

determining a mode of operation by which subsequent image data generated by the particular ROI is to be processed; and processing, based on the mode of operation and the frame rate, the image data comprising a plurality of ROI images of the detected object of interest.

* * * * *